United States Patent [19]

Covert

[11] Patent Number: 5,282,525
[45] Date of Patent: Feb. 1, 1994

[54] PRODUCT ACCUMULATOR

[76] Inventor: William J. Covert, P.O. Box 365, Berlin, N.J. 08009

[21] Appl. No.: 972,539

[22] Filed: Nov. 6, 1992

[51] Int. Cl.$^5$ .............................................. B65G 1/00
[52] U.S. Cl. .................. 198/347.1; 198/454
[58] Field of Search ............... 198/347.1, 347.4, 453, 198/454

[56] References Cited

U.S. PATENT DOCUMENTS

| | | | |
|---|---|---|---|
| 2,315,880 | 4/1943 | Stiles ................................... | 198/454 |
| 3,465,868 | 9/1969 | Donner ........................ | 198/347.2 X |
| 3,601,240 | 8/1971 | Dominici ........................ | 198/454 X |
| 3,610,396 | 10/1971 | Babunovic ........................... | 198/454 |
| 3,866,739 | 2/1975 | Sikorski ................................ | 198/453 |
| 3,876,063 | 4/1975 | Saarima et al. ..................... | 198/453 |

FOREIGN PATENT DOCUMENTS

2621564 12/1976 Fed. Rep. of Germany ... 198/347.1
0051415 3/1986 Japan ................................. 198/347.1

Primary Examiner—James R. Bidwell
Attorney, Agent, or Firm—Norman E. Lehrer

[57] ABSTRACT

An article accumulator utilized between a product infeed line and a discharge conveyer feeds articles from the infeed to the discharge conveyer in a single, continuous line. The accumulator includes a wide horizontal moving conveyer belt that accumulates articles in the event of a backup at the discharge end. A slow moving flexible guide belt located just above the conveyer belt and angled toward the discharge conveyer engages the sides of the articles and helps to move them toward the discharge conveyer. In the event that a substantial number of articles accumulate on the accumulator conveyer belt, these articles push sideways on the guide belt forcing it rearwardly behind a guide rail that runs along the length of the guide belt. The articles then engage the guide rail and are less influenced by the movement of the guide belt. This arrangement helps to ensure that the articles that are first placed on the conveyer belt tend to be the first articles to be discharged.

5 Claims, 3 Drawing Sheets

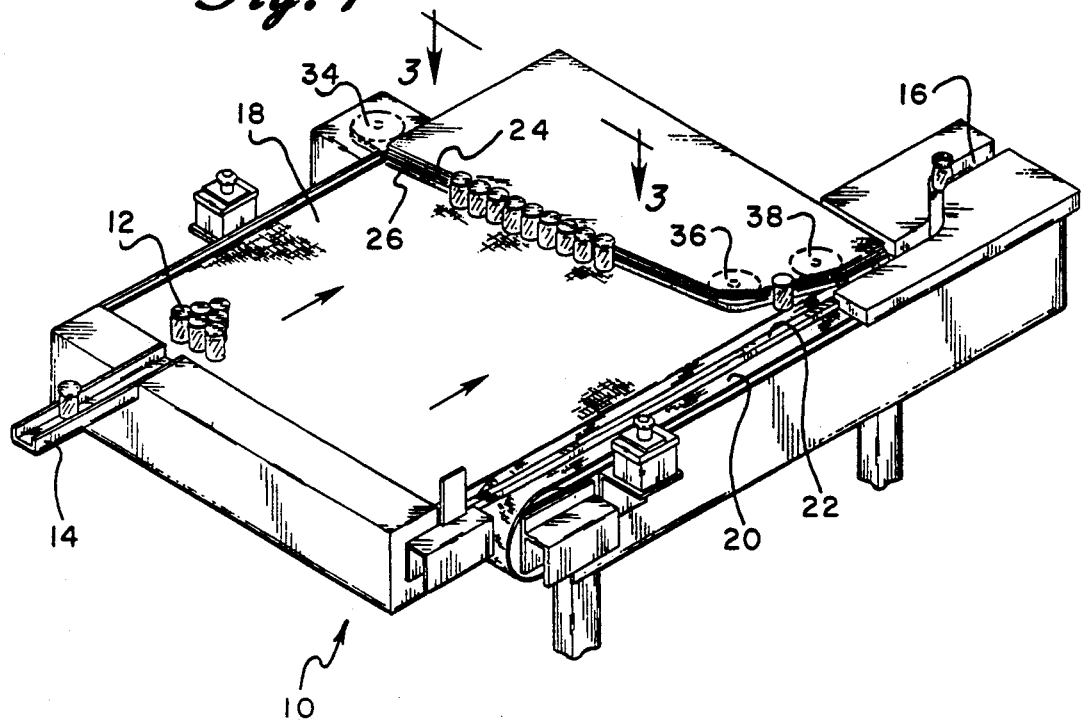
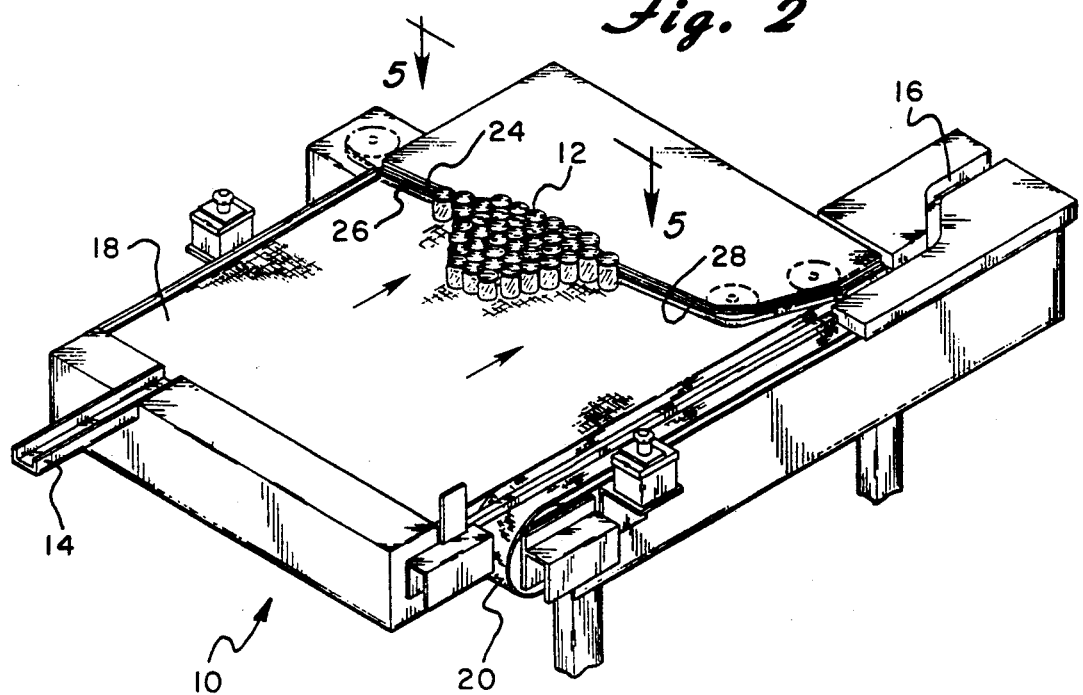

PRODUCT ACCUMULATOR

BACKGROUND OF THE INVENTION

The present invention is directed toward a product accumulator and, more particularly, toward a flow-thru type wherein products are placed on a conveyer at one end and are discharged at the other end thereof but which allows the products to accumulate in the event of a backup at the discharge end.

Product accumulators of the general class to which the present invention pertains are not new, per se. They generally include a horizontally disposed conveyer belt having an infeed end onto which products such as glass vials, cans or bottles or the like are placed. Along the side of the main conveyer belt and running parallel therewith is a discharge conveyer belt. As the products are moved along the main conveyer belt, they eventually engage a guide rail or guide belt which is arranged at an angle across the main conveyer belt so as to guide the articles onto the discharge belt. Additional guide rails or the like in the vicinity of the end of the main conveyer adjacent the discharge conveyer ensure that the articles exit the discharge conveyer in a single row. In the event of a blockage at the discharge conveyer, the articles merely back up on the main conveyer belt as the belt slides under them.

Numerous examples of the foregoing can be seen in the prior art. General arrangements of these types can be seen in U.S. Pat. Nos. 1,990,549; 2,560,995; 2,763,359 and 3,162,291. Published Japanese application No. 55-161,715 also shows a similar arrangement.

Although the prior art accumulators function reasonably well, they all suffer from a similar problem. That is, there is no assurance that the first articles placed on the main conveyer will be part of the first group of articles to be discharged. In experimenting with accumulating conveyers of the general type described above, it has been found that once the articles begin to accumulate, articles which were first placed on the conveyer can be forced onto the side of the pack or recycled around the main conveyer without ever being discharged therefrom. Of course, the articles will eventually all be discharged once the infeed is stopped but this may occur only at the end of the day. Thus, articles placed on the conveyer in the morning may still be there at the end of the day which may be detrimental if the product within the vial or other container should have been processed within a certain amount of time. To Applicant's knowledge no accumulator conveyer of this type has addressed the problem of attempting to ensure that articles are discharged from the accumulator in an order which reasonably resembles the order in which the articles are fed thereto.

SUMMARY OF THE INVENTION

The present invention addresses the foregoing problem and, therefore, is believed to overcome the problems created by the prior art discussed above. The article accumulator of the invention is utilized between a product infeed line and a discharge conveyer for feeding articles from the infeed to the discharge conveyer in a single, continuous line. The accumulator includes a wide horizontal moving conveyer belt that accumulates articles in the event of a backup at the discharge end. A slow moving flexible guide belt located just above the conveyer belt and angled toward the discharge conveyer engages the sides of the articles and helps to move them toward the discharge conveyer. In the event that a substantial number of articles accumulate on the accumulator conveyer belt, these articles push sideways on the guide belt forcing it rearwardly behind a guide rail that runs along the length of the guide belt. The articles then engage the guide rail and are less influenced by the movement of the guide belt. This arrangement helps to ensure that the articles that are first placed on the conveyer belt tend to be the first articles to be discharged.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a top perspective view of a product accumulator in accordance with the present invention and showing only a few articles thereon;

FIG. 2 is a view similar to FIG. 1 but showing a more substantial number of articles accumulated on the accumulator belt;

DETAILED DESCRIPTION OF THE PREFERRED EMBODIMENT

Figure 3:
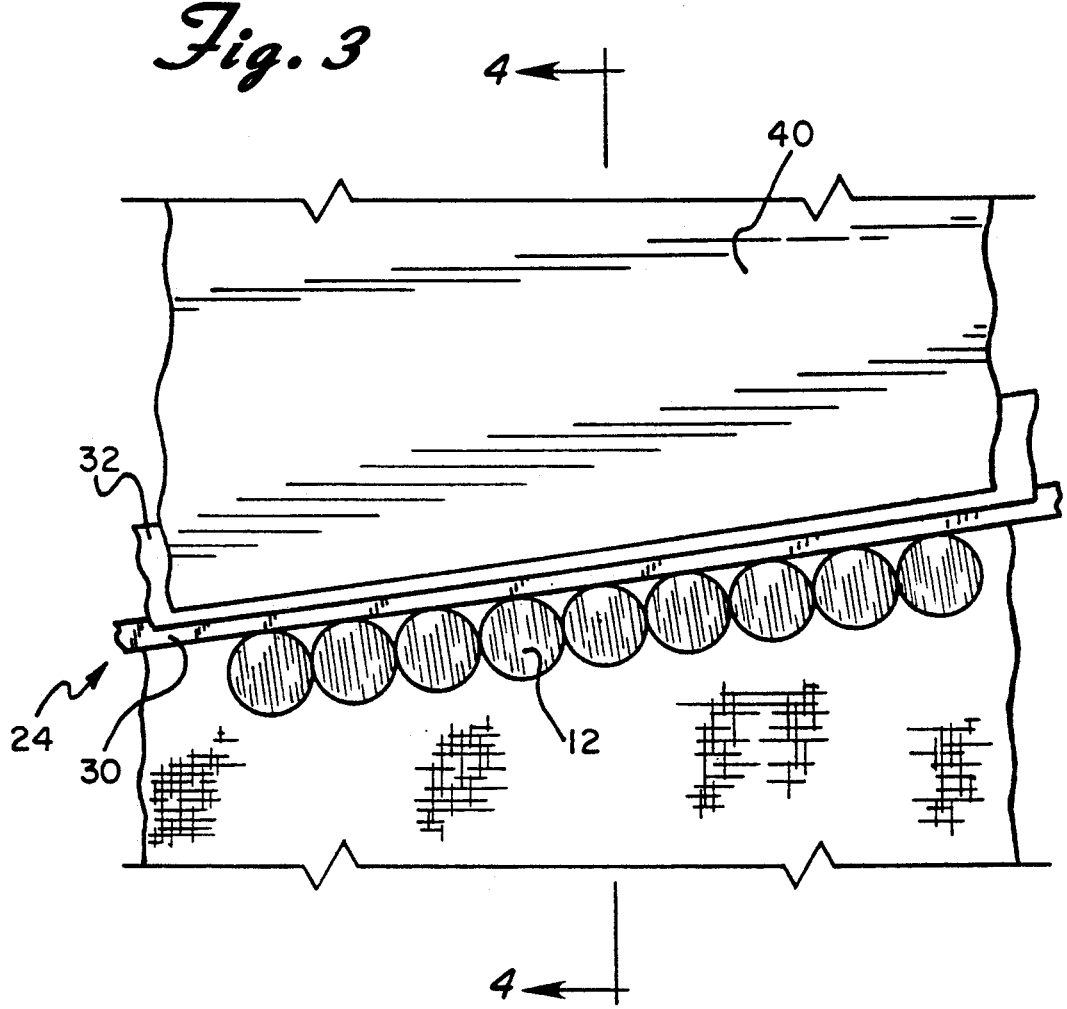
FIG. 3 is a top plan view taken along the line 3—3 of FIG. 1.

Referring now to the drawings in detail wherein like reference numerals have been used throughout the various figures to designate like elements, there is shown in FIGS. 1 and 2 a perspective view of a product accumulator constructed in accordance with the principles of the present invention and designated generally as 10. Accumulator conveyer 10 is intended to move articles such as the vials 12 between an infeed conveyer 14 and a single line discharge conveyer such as shown at 16.

The conveyer 10 is comprised essentially of a main horizontally arranged accumulator or conveyer belt 18 which is driven in a known manner away from the infeed 14 as shown by the arrows. Running parallel with the conveyer belt 18 and immediately adjacent the right side thereof as shown in FIGS. 1 and 2 is a smaller discharge conveyer belt 20. An adjustable rail 22 is arranged substantially parallel to the length of the conveyer belt 20 so as to expose only enough of the upper surface of belt 20 to accommodate a single row of vials 12.

Discharge conveyer belt 20 is also moved in a known manner in the same direction as the main conveyer 18. In the preferred embodiment of the invention, the speed of the discharge conveyer belt 20 is somewhat greater than the speed of the main conveyer 18.

Located adjacent the far end of the conveyer belt 18 opposite the infeed conveyer 14 and extending substantially across the entire width of the conveyer 18 is a guide means 24. Guide means 24 is arranged diagonally across the width of the conveyer belt 18. That is, the end 26 of the guide means 24 to the left of the apparatus as shown in FIGS. 1 and 2 is closer to the infeed or forward end of the conveyer belt and the right side or end 28 of the guide means 24 is further therefrom. As a result, articles 12 moving on the belt 18 that engage the guide means 24 are guided to the right, toward and onto the discharge conveyer 20 where they are discharged one at a time to the discharge line 16.

As pointed out above, diagonally arranged guide means are, per se, known in the art. These have included a stationary guide rail diagonally arranged across the main conveyer which merely guides the articles toward the discharge end which articles are moved simply by the interaction of the main conveyer belt pushing on the bottom of the articles and the articles engaging the guide rail. In addition, moving belts arranged in a similar manner diagonally across the main conveyer belt are known and are used to help guide the articles across the conveyer belt onto the discharge conveyer. The present invention utilizes both of these techniques in a unique manner.

As is perhaps best seen in FIG. 3, the guide means 24 is comprised of a flexible guide belt 30 and a guide rail 32. Guide belt 30 and guide rail 32 are substantially coextensive with each other extending substantially all of the way across the accumulator belt 18 in a diagonal manner. As shown best in FIGS. 4 and 6, both guide belt 30 and guide rail 32 are located above the plane of the conveyer belt 18 with the guide rail 32 being located above the top of the guide belt 30. Both the guide belt 30 and the guide rail 32 are, however, located relatively close to the upper surface of the conveyer belt 18 so that they can engage the side walls of the vials 12 or other articles being conveyed.

The guide belt 30 is a single closed loop of a synthetic rubber-like material which is arranged around pulleys 34, 36 and 38 and is driven in a known manner so that the portion of the belt 30 which is coextensive with the guide rail 32 moves from left to right as viewed in the figures toward the discharge conveyer 20. Primarily for aesthetic purposes and to prevent injury, a top plate 40 covers the major portions of the pulleys 36 and 38 and the nonworking portion of the guide belt 30.

That portion of the guide belt 30 which is substantially coextensive with the guide rail 32 is merely stretched across the width of the accumulator conveyer belt 18. That is, there is no intermediate support or fixed guide means for the guide belt 30. As a result, with sufficient forces applied against the belt 30 and perpendicular to its length, it can flex rearwardly in the direction of movement of the belt 18 so as to underlie the guide rail 32 as can be best seen in FIG. 6. It should be readily apparent to those skilled in the art that significantly less force would be required to flex the center part of the guide belt 30 inwardly than would be needed near the ends of the guide belt adjacent the pulleys 34 and 36.

Figure 4:
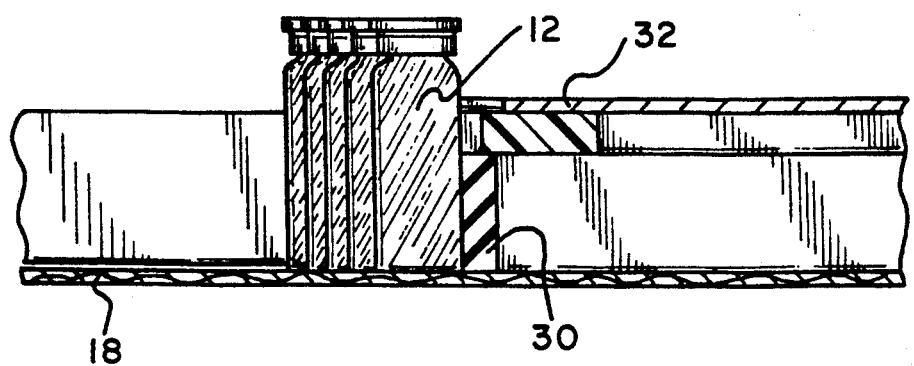
FIG. 4 is a cross-sectional view taken through the line 4—4 of FIG. 3.
Figure 5:
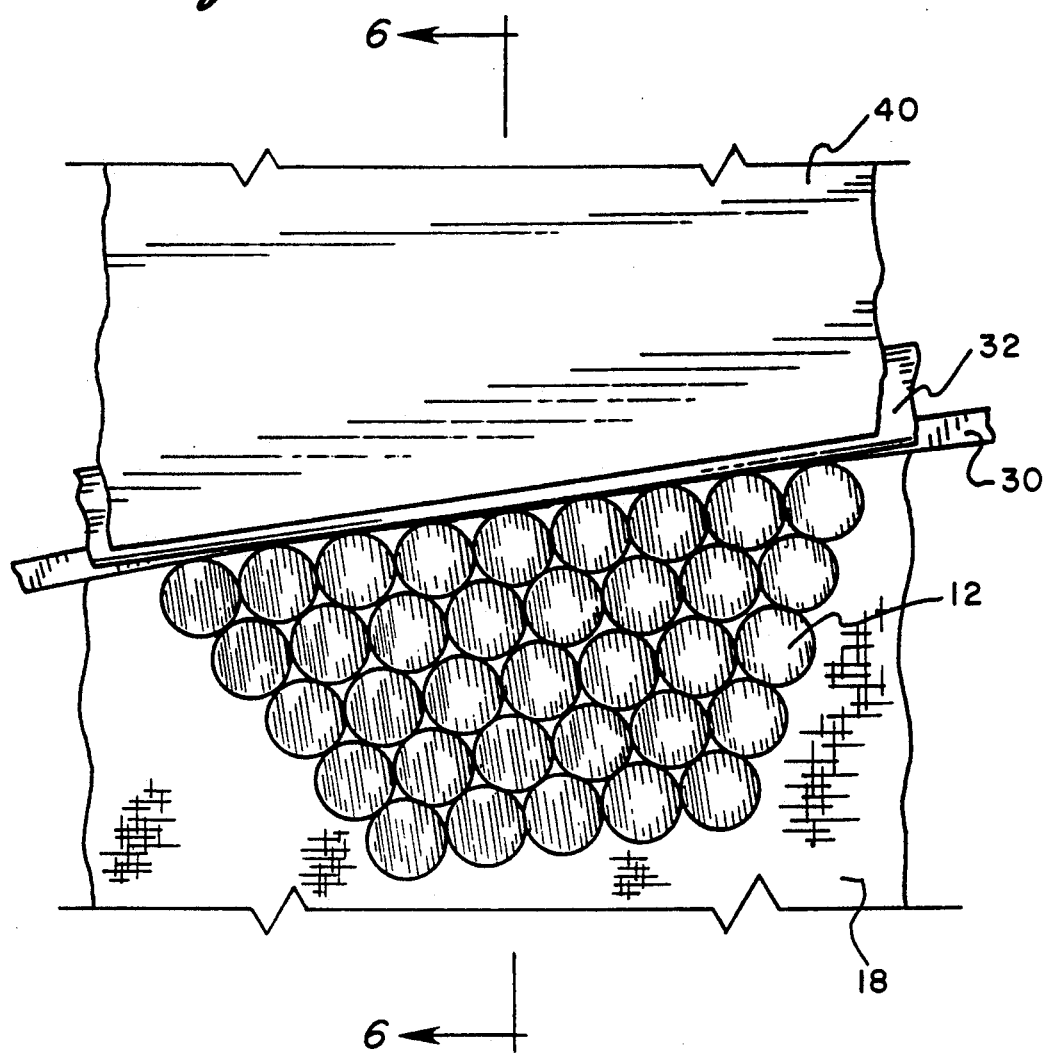
FIG. 5 is a top plan view taken along the line 5—5 of FIG. 2.
Figure 6:
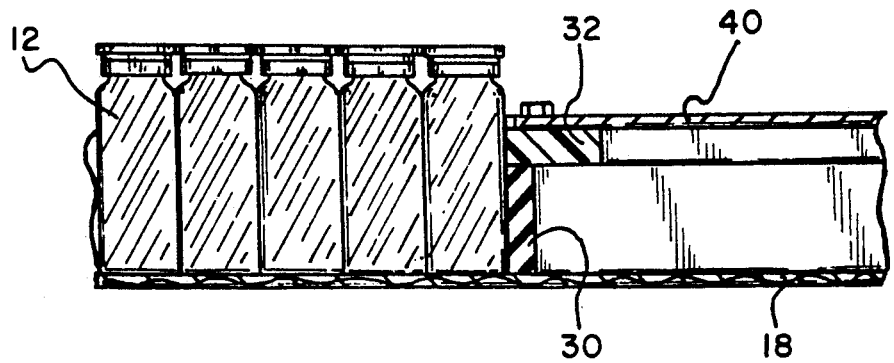
FIG. 6 is a cross-sectional view taken through the line 6—6 of FIG. 5.

As can best be seen from FIGS. 3 and 4, when only a few vials 12 are on the conveyer belt 18 and engage the guide means 24, the guide belt 30 is exposed and engages the side walls of the vials in order to help move them to the right, off of the main conveyer 18 and onto the discharge conveyer 20. While the conveyer 18 moving under the vials 12 does move them rearwardly applying a small inward force to the flexible guide belt 30, this force is insufficient to cause any significant inward movement or flexure of the belt 30. However, as more vials 12 accumulate on the conveyer 18, a much greater force is applied against the guide belt 30 and the same is caused to flex inwardly beneath the guide rail 32 as shown in FIGS. 5 and 6. When this occurs, at least the major central portion of the guide belt 30 has moved sufficiently rearwardly so that the first row of vials 12 engages the guide rail 32. These vials continue to be guided to the discharge conveyer but primarily by the guide rail 32 rather than the guide belt 30.

As the vials 12 move substantially all the way to the right of the conveyer as viewed in FIGS. 1 and 2, the guide belt 30 is always exposed as it is guided around the pulleys 36 and 38 and acts as a positive moving guide to assist the vials onto the discharge conveyer 20.

The number of vials 12 that must accumulate on the conveyer 18 before a sufficient force is applied to flex the guide belt 30 rearwardly beneath the guide rail 32 will, of course, vary depending on certain factors. These factors include the size and composition of the vials 12, the composition of belt 18 and, therefore, the coefficient of friction between the belt 18 and the vials 12, the speed of the belt 18, the composition of the guide belt 30 and the tension placed on the guide belt. Many of these factors such as the speed of the belt 18 and the tension on the belt 30 can be adjusted. It has been found that the best results are achieved when approximately four or five rows of vials cause the guide belt 30 to flex inwardly so that at least the centermost vials begin to touch the guide rail 32.

Applicant is not entirely certain as to the scientific principles or mechanics by which the above-described invention achieves the desired results. It has been found, however, that with the present invention, it is more likely that the vials which are the first to be fed onto the conveyer 18 are amongst the first to be discharged therefrom even if there has been a period of accumulation. This may be due to the fact that prior arrangements create more chaotic and random motion of the vials while the present invention achieves a more controlled movement thereof.

The present invention may be embodied in other specific forms without departing from the spirit or essential attributes thereof and accordingly reference should be made to the appended claims rather than to the foregoing specification as indicating the scope of the invention.

I claim:

1. A flow-thru type product accumulator wherein articles are placed on the accumulator at one end and are discharged at the other end thereof but which allows the articles to accumulate in the event of a backup at the discharge end comprising:

a product accumulator belt, a substantial portion of said belt lying in a substantially horizontal plane and having an infeed end and a discharge end remote from said infeed end, said belt being adapted to support a quantity of articles to be accumulated thereon;

means for driving said accumulator belt so that it substantially continuously moves from said infeed end toward said discharge end so as to convey articles from said infeed end toward said discharge end;

a discharge conveyer, said discharge conveyer being located adjacent the discharge end of said accumulator belt;

means for driving said discharge conveyer in substantially the same direction as said accumulator belt whereby articles on said accumulator belt can be moved onto said discharge conveyer to be conveyed downstream;

guide means located above said accumulator belt to guide articles from said accumulator belt to said discharge conveyer, said guide means being comprised of an elongated guide rail and an elongated guide belt substantially coextensive therewith but located in a different horizontal plane, said guide means being arranged substantially diagonally across said accumulator belt;

means for driving said guide belt so that articles contacting the same are moved toward said discharge conveyer;

at least a substantial portion of said guide belt normally extending outwardly past said guide rail toward the infeed end of said accumulator belt so as to contact articles on said accumulator belt, said guide belt being flexible and movable rearwardly whereby when a significant number of articles are on said accumulator belt, said articles move said guide belt rearwardly so that a number of articles engage both said guide belt and said guide rail.

2. The invention as claimed in claim 1 wherein said guide belt is located below said guide rail.

3. The invention as claimed in claim 1 wherein the speed of said discharge conveyer is greater than the speed of said product accumulator belt.

4. The invention as claimed in claim 1 further including means for causing said articles to exit said discharge conveyer in a single row.

5. The invention as claimed in claim 1 wherein said discharge conveyer is located adjacent one side of said product accumulator belt and is substantially coextensive therewith.

* * * * *